May 14, 1968 HUGH L. DRYDEN, DEPUTY 3,383,461
ADMINISTRATOR OF THE NATIONAL AERONAUTICS
AND SPACE ADMINISTRATION
REDUCED BANDWIDTH VIDEO COMMUNICATION SYSTEM
UTILIZING SAMPLING TECHNIQUES
Filed Aug. 17, 1964 3 Sheets-Sheet 1

INVENTOR
LEONARD R. MALLING
BY G. McCoy
ATTORNEY

May 14, 1968 HUGH L. DRYDEN, DEPUTY ADMINISTRATOR OF THE NATIONAL AERONAUTICS AND SPACE ADMINISTRATION 3,383,461

REDUCED BANDWIDTH VIDEO COMMUNICATION SYSTEM UTILIZING SAMPLING TECHNIQUES

Filed Aug. 17, 1964

3 Sheets-Sheet 2

INVENTOR
LEONARD R. MALLING
BY [signature]
ATTORNEY

INVENTOR
LEONARD R. MALLING
BY G. T. McCoy
ATTORNEY

United States Patent Office 3,383,461
Patented May 14, 1968

3,383,461
REDUCED BANDWIDTH VIDEO COMMUNICATION SYSTEM UTILIZING SAMPLING TECHNIQUES

Hugh L. Dryden, Deputy Administrator of the National Aeronautics and Space Administration with respect to an invention of Leonard R. Malling, Altadena, Calif.
Filed Aug. 17, 1964, Ser. No. 390,251
6 Claims. (Cl. 178—6)

ABSTRACT OF THE DISCLOSURE

A system for decreasing the time-bandwidth requirements in transmitting or storing information, comprising a circuit for monitoring an input signal to indicate which portions are varying rapidly and which are not. The monitoring circuit controls a sampling circuit which samples the input signal at long intervals for those portions which vary slowly and at short intervals for those signal portions wherein a rapid variation occurs. The samples are entered into a buffer storage apparatus which transmits the samples at regular intervals, regardless of the intervals between which the samples were taken. Marker signals indicating the intervals between which the samples were taken, are mixed with the samples for entry in the buffer.

*Origin of invention*

The invention described herein was made in the performance of work under a NASA contract and is subject to the provisions of Section 305 of the National Aeronautics and Space Act of 1958, Public Law 85–568 (72 Stat. 435; 42 USC 2457).

This invention relates to information transmission systems, and more particularly to improvements therein.

It is generally preferable, when transmitting information by radio waves or the like, to employ the least bandwidth and the least amount of time to transmit a given amount of information. Many types of signals, and especially video signals for reproducing pictures, contain many redundancies; that is, periods of time wherein a signal is essentially constant. For example, a picture or image may contain large areas of constant brightness, such as clouds, and result in a video signal containing sections of constant voltage. Transmitting a signal of large bandwidth to assure the communication of the fine details of an image, wherein the signal is essentially constant most of the time, is wasteful of the capabilities of the system. The result is that a much longer period of time and greater bandwidth is employed to transmit a given amount of significant data than is necessary. A communications system which eliminated most of the redundant signals in a communication, but which supplied sufficient information to enable the accurate reconstruction of substantially the entire signal would be of great value in furthering the efficiency of communication.

In the system of this invention, video signals or the like are continually monitored to determine whether they are rapidly varying and thus include a high proportion of significant data, or are slowly varying and thus are composed primarily of redundancies. If the signal changes rapidly during a predetermined period, for example, $5\Delta t$ seconds in duration, then many signal samples are taken during that period, for example, at intervals of $\Delta t$ seconds, and entered in a recorder for later transmission. If the signal is not rapidly changing, then only one sample is taken during that period $5\Delta t$ and entered in the recorder. Thus, the sampling rate is constantly adjusted according to the information contained in the signal. The samples are entered at uniform spaced intervals on the magnetic drum surface or other recording medium of the recorder, regardless of whether they occur at small intervals, such as $\Delta t$, or large intervals, such as $5\Delta t$, in the original signal. Accordingly, when the recorded samples are uniformly read from the recorder and transmitted, a new sample is transmitted during every cycle of the transmitting carrier wave, and the transmitting bandwidth is efficiently utilized. An indicating pulse is also recorded and transmitted with each sample that occurs at the beginning of the predetermined period during which one or a group of samples are taken, to enable the receiver to provide the proper spacing between the samples in reproducing the picture.

In one embodiment of the invention, entire horizontal scan lines of a video signal are read-out for transmittal, recorded on tape, or the like, but only one out of several successive lines is thus read-out or recorded unless there are many rapidly changing portions in the scan lines, denoting areas of fine detail. As in the previously described system, the signals are recorded uniformly regardless of whether they represent successive or separated scan lines.

Although the invention is especially useful for efficient radio wave communication, it is also useful for making video tape recordings of minimum length and in other applications where a maximum time-bandwidth utilization is desirable.

Accordingly, one of the objects of the present invention is to provide an efficient system for communicating information originally obtained in a form which includes many groups of redundant signals.

Another object is to provide a communication system of improved time-bandwidth information transmittal efficiency, for signals which include intervals of rapid change and intervals of little or no change.

Another object is to provide a video signal transmitter which efficiently utilizes a predetermined, substantially constant transmitting bandwidth.

Yet another object is to provide a video signal communication system wherein only a portion of the total number of available scan lines in each image is transmitted, a larger portion of scan lines being transmitted for those image areas containing greater detail.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

Figure 1:
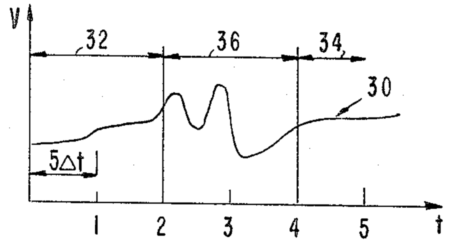
FIGURE 1 is a graph of a video signal showing its voltage variation with time.
Figure 2:
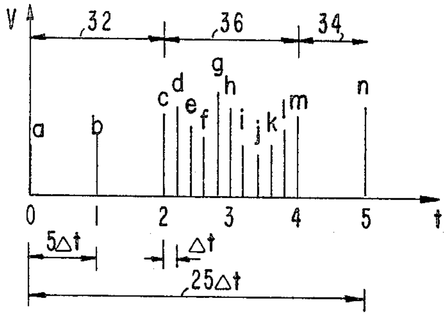
FIGURE 2 is a graph representing the video signal of FIGURE 1 sampled at intervals of $\Delta t$ or $5\Delta t$.
Figure 3:
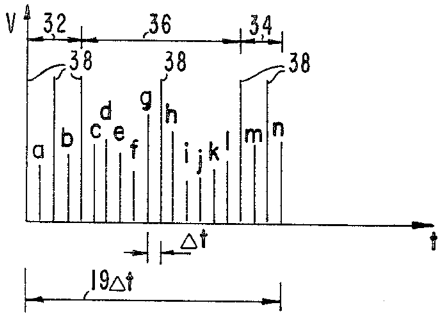
FIGURE 3 is a graph representing the sampled video signal of FIGURE 2 to which coding pulses have been added, all samples and pulses being uniformly spaced for transmission.

Reference is now made to the drawings and particularly to FIGURES 1, 2 and 3 which represent typical signals employed in a communication system of this invention. FIGURE 1 represents a section of an original signal 30, such as a video signal derived from a television camera, which is processed and then transmitted by the transmitter system of this invention. The voltage V of the signal is generally proportional to the brightness of the image at points along a video scanning line. Some portions 32 and 34 of the signal have small variations in amplitude and they represent image areas of almost constant brightness and therefore little or no detail; other areas 36 of rapid amplitude variations represent image areas containing portions of markedly different brightness and therefore having substantially more detail.

It is often convenient to sample the signal 30 and transmit these samples to a receiver for reconstruction of the original signal. The samples must be taken at small enough time intervals to assure that significant variations in the signals do not occur between samples. It is apparent from FIGURE 1 that samples need only be taken at long intervals in the sections 32 and 34 which include only slow signal variations, while samples must be taken at much smaller time intervals in the section 36 which contains rapid variations. FIGURE 2 represents samples of the signal 30 of FIGURE 1 taken at small intervals $\Delta t$ in the portion 36 of rapid variation and at intervals $5\Delta t$ which are five times as long, in the portions 32 and 34 of slow variation.

It is possible to transmit the signal samples of FIGURE 2 as soon as they are taken. However, the transmitting bandwidth would have to be large enough to accommodate the most rapid sampling rate, $1/\Delta t$ samples per second, even though the full bandwidth would be used only part of the time. There would generally be little advantage in such a system because the bandwidth and the time required to transmit a given amount of information would be the same as if the most rapid sampling rate, $1/\Delta t$ samples per second, were constantly employed.

In the system of this invention, signal portions are sampled at a rapid or slow rate, depending on whether the portions contain rapid or slow variations. However, the samples are not immediately transmitted, but are stored for later transmission. The samples are then transmitted at a generally uniform rate so that there is no large interval between samples taken at a slow rate representing slowly varying portions of the original signal, even though they were originally taken at large intervals. As a result, the entire transmitting bandwidth is constantly utilized. In addition to transmitting the video samples, marking pulses are transmitted to indicate which samples have been taken at small intervals and which samples have been taken at large intervals, to enable the accurate reconstruction of the original video signal and image by the receiver.

FIGURE 3 represents the signal samples of FIGURE 2 wherein the intervals between widely separated samples, such as those labeled *a* and *b*, have been reduced. Additionally, marking signals 38 have been inserted before the first sample of each long interval $5\Delta t$ of the original signal 30. A comparison of FIGURES 2 and 3 shows that the reduction of the interval between some samples such as those labeled *a* and *b* results in the transmission of the same signal section in a short period of time for a given transmission frequency $1/\Delta t$. For the example of FIGURES 2 and 3, the reduction in transmission time is by a factor of 19/25. The marking signals 38 may be pulses of an amplitude slightly larger than any amplitude of the signal 30 which is transmitted without attenuation. The use of such marker signals requires the employment of a slightly larger bandwidth in transmitting the signals of FIGURE 3 than the signals of FIGURES 1 or 2, but the overall time-bandwidth product is considerably reduced for the typical video signal which has large periods of redundancy. Generally, it is more convenient to transmit the signals of FIGURE 3 at a slower rate than the sampling rate of $1/\Delta t$ of the initially sampled signal of FIGURE 2, so that large signal sections, e.g., the combined sections 32+34+36, are transmitted in approximately the same time period that they occupy in the original signal 30. In this case, a lower transmission frequency and small bandwidth are required to transmit the same information as would be required to transmit the uncompressed signal of FIGURE 2, in the same time period.

Figure 4:
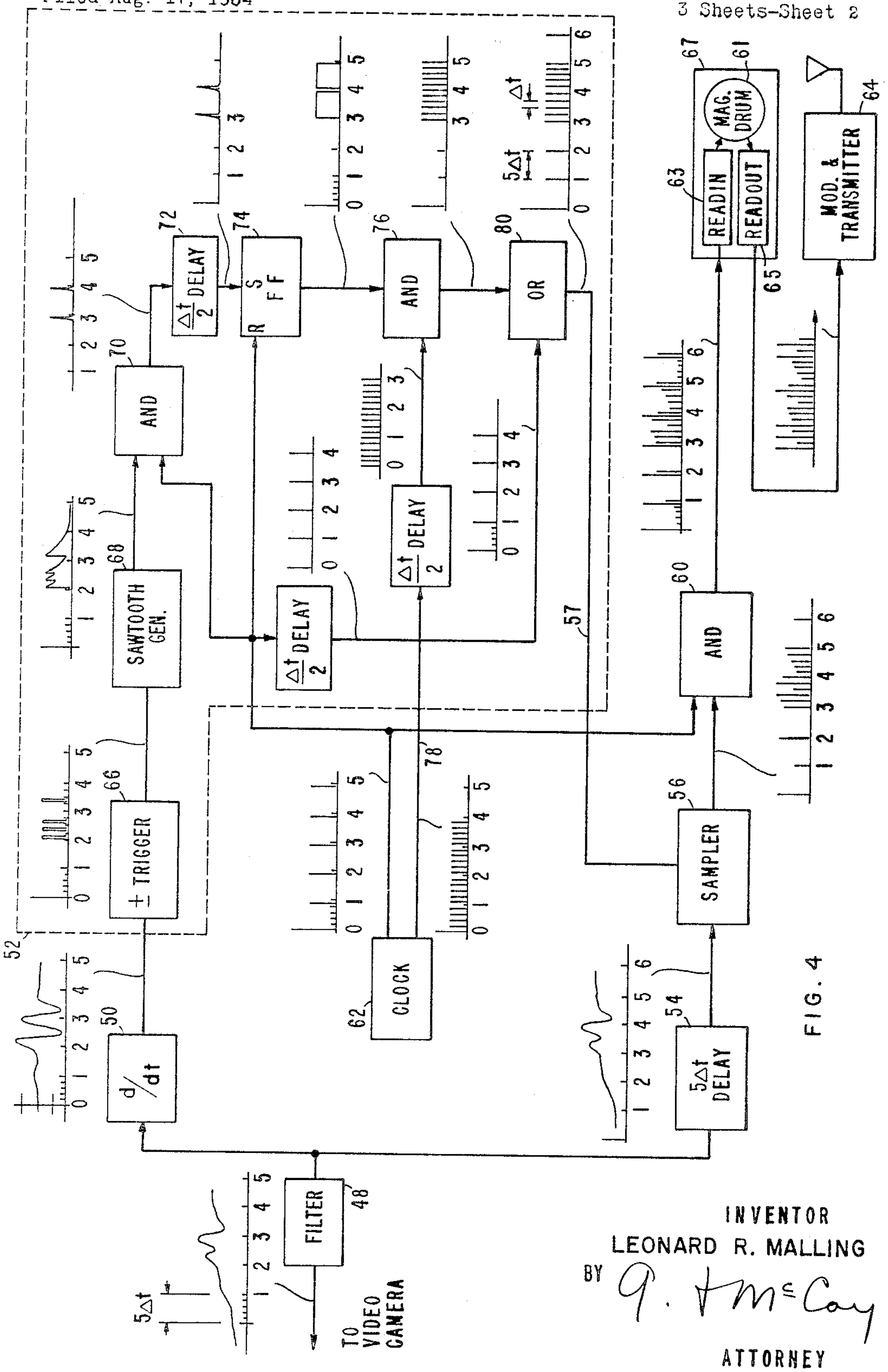
FIGURE 4 is a block diagram of a transmitter system constructed in accordance with the present invention.

A transmission system shown in block diagram form in FIGURE 4 serves to generate transmission signals, such as those of FIGURE 3, from a video signal or the like originally available in a form similar to that of the signal 30 represented in FIGURE 1. In the system of FIGURE 4, a video signal obtained from a video camera or other source, preferably filtered in filter 48 if considerable noise is present, is entered into a differentiating circuit 50 to obtain a signal representing the rate of change of the video signal. When the video signal is rapidly changing, an output of large absolute value is obtained from the circuit 50. The output of the differentiating circuit 50 is connected to a sampling rate control circuit 5 which monitors the rate of change of the video signal during intervals of time duration $5\Delta t$ and delivers control signals on an output line 57. This circuit 52 generates a single pulse at the beginning of the next time period of duration $5\Delta t$ if the rate of change of the video signal during the preceding time period $5\Delta t$ was less in absolute value than a certain threshold value B. If the rate of change of the video signal was greater in absolute value than the threshold value B, then five pulses separated by the intervals $\Delta t$ are generated during the next time interval of duration $5\Delta t$. A more detailed explanation of the sampling rate contral circuit 52 will be given below.

The video signal obtained from the video camera is also delivered to a delay circuit 54 which delays it by a time period of $5\Delta t$. The delayed video signal is delivered to a sampler circuit 56. The circuit 56 samples the signal whenever it receives a sampling control pulse from line 57 of the sampling rate control circuit. Thus, the sampler circuit 56 samples the delayed video signal at intervals of $\Delta t$ or $5\Delta t$, depending on whether the video signal was varying rapidly or slowly, respectively, during the preceding period of duration $5\Delta t$. Inasmuch as the video signal sampled by the circuit 56 has been delayed by a period of $5\Delta t$, and the sampling rate depends upon the video signal variation during the preceding $5\Delta t$ period, the output of the circuit 56 comprises samples of the video signal taken at intervals $\Delta t$ for video signal sections which include fast variations, and samples taken as intervals of $5\Delta t$ for signal sections which include only slow variations.

The output of the sampler circuit 56 is delivered to an "And" gate 60. Also connected to the And gate 60 is the output of a clock circuit 62 which generates marker pulses spaced at intervals of $5\Delta t$, each marker pulse delivered just before the delivery of samples taken by the circuit 56 at intervals of $\Delta t$, and generally about $\frac{1}{2}\Delta t$ before. The output of the And circuit 60 comprises a sampled video signal and marker pulses between each sample or between each group of five samples.

The output of the And circuit 60, which comprises a train of pulses, is recorded in a buffer circuit 67. The buffer circuit 67 comprises a memory device 61, such as a magnetic drum, and read-in and read-out circuits 63 and 65. The read-in circuit 63 is constructed so as to record the amplitude of each separate pulse received from the And circuit 60 at successive adjacent locations of the memory, regardless of the time interval between the received pulses. The read-out circuit 65 is constructed so as to deliver signals representing amplitudes of the recorded signals at a uniform rate. The output of the buffer circuit 67 is delivered to a transmitter 64 for modulation with a carrier wave and transmission.

The construction and operation of the sampling rate control circuit 52 is shown in FIGURE 4. The output of the differentiating circuit 50 is delivered to a trigger circuit 66 which is constructed so as to deliver a pulse whenever the input thereto is increasing in absolute value and passes through a certain amplitude B in absolute value. The pulses from trigger circuit 66 are delivered to a saw tooth generator 68 which begins to generate a new inverted saw tooth waveform each time a pulse is received. The saw tooth waveform decays to substantially zero in a time period $5\Delta t$. Thus, if a trigger pulse is received by generator 68 during any given period of duration $5\Delta t$, there will still be an appreciable output at the end of the period.

The output of the generator 68 and clock pulses spaced at intervals $5\Delta t$ obtained from clock 62 are delivered to an And gate 70. The output of the And gate 70 comprises a pulse occurring $\frac{1}{2}\Delta t$ before each sampling period of duration $5\Delta t$ when the video signal has varied rapidly during the preceding $5\Delta t$ period. The output of the And gate 70 is delayed in circuit 72 by a period of about $\frac{1}{2}\Delta t$ and then delivered to the Set side of an R-S flip-flop circuit 74. The Reset side of the flip-flop circuit 74 is connected to the clock 62. The flip-flop is turned on (set) and remains on for a period of almost $5\Delta t$ whenever a rapid variation has occurred in a video signal during the preceding $5\Delta t$ interval. The output of the flip-flop circuit 74 is delivered to an And gate 76. The And gate 76 is also connected to an output line 78 which delivers pulses at intervals of $\Delta t$ from the clock 62. The output of the And gate 76 and clock pulses occurring at intervals $5\Delta t$ and delayed by a period $\Delta t/2$ are delivered to an Or gate 80 where they are added. The output of the Or gate 80 comprises a single pulse at the end of each period of duration $5\Delta t$ during most of which the video signals has varied at less than a threshold rate, and a train of five pulses beginning at the end of the period if the video signal has varied rapidly. These control signals are applied to the sampler circuit 56 as described herein-before.

If video signals are to be transmitted during a long period of time, the read-out rate of buffer 67 should be approximately equal to the average rate at which signals are read into the magnetic drum thereof. This may be accomplished by raising the threshold B of the trigger 66 when the memory of the buffer 67 is almost fully occupied so that rapid sampling is made only for very large video signal variation rates, and by lowering the threshold B when the memory is almost empty.

Although a magnetic drum memory is useful in many applications, other memory devices such as magnetic cores and tape recorder memories may be used instead.

Figures 5, 6:
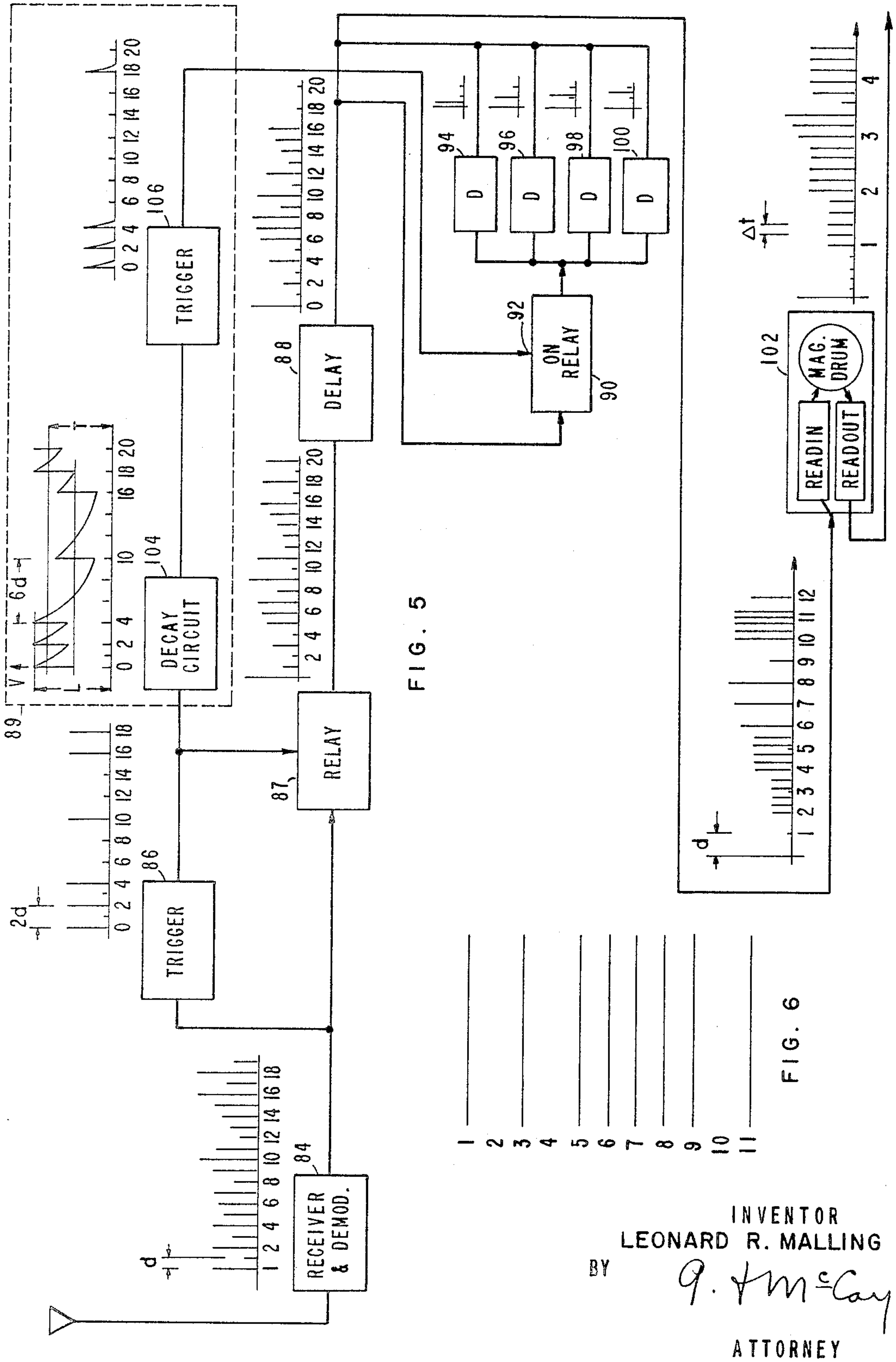
FIGURE 5 is a block diagram of a receiver system constructed in accordance with the present invention.
FIGURE 6 is a representation of a video image wherein only a portion of the scan lines thereof are present.

A receiver system for reconstructing the original video image from the signals generated by the above-described transmitter system is shown in block diagram form in FIGURE 5. The receiver system comprises a demodulator 84 for obtaining the same signals that are read out from the buffer 67 of the transmitter before modulation by a carrier wave. The output of the demodulator 84 is delivered to a trigger circuit 86 which delivers a pulse only when an input signal of the amplitude of a marker signal is received. The output of the trigger circuit 86 is composed of only the marker pulses and this output is delivered to a relay 87 to turn it off momentarily. The output of the demodulator 84 is delivered to the relay 87 and passes therethrough except when a marker signal occurs and the trigger 86 opens the relay. The output of the relay 87 is therefore composed only of the samples of the original video signal.

The trigger circuit 86 is also connected to a fill-in circuit 89 which yields a fill-in signal for enabling the generation of four more signals in the interval between two adjacent video signal samples originally spaced $5\Delta t$ apart in the video signal. The operation of this circuit will be more fully described hereinafter.

The output of the relay 87 is conducted through a delay circuit 88 which delays it by an interval $d$ equal to the period between successive pulses received from the demodulator 84. The output of the delay circuit 88 is conducted to a relay 90 which is closed only when a signal is being received in the control port 92. The control port 92 receives signals from fill-in circuit 89 during only the instants when a video signal sample is received by the relay 90 which is the only sample taken during a sampling period $5\Delta t$ of the transmitter system. Only those samples originally taken at intervals of $5\Delta t$ pass through the relay 90 to four delay circuits 94, 96, 98 and 100, the delay circuits delaying the sample by amounts of approximately $d/3$, $2d/3$, $d$, and $4d/3$, respectively. The outputs of the delay circuits 94, 96, 98 and 100, and the output of circuit 88 are all delivered to a buffer 102 similar to the buffer 63 of FIGURE 4. The output of the buffer 102 is a train of uniformly spaced signals containing five different samples from each period of the video signal which is changing rapidly and five identical signals from each period of little or no change. The output of the buffer may be smoothed in a smoothing circuit and used to operate a television display tube.

The fill-in circuit 89 of FIGURE 5 comprises a decay circuit 104 which yields a decaying signal which is boosted by each new pulse from the trigger circuit 86. One form of such a decay circuit comprises a capacitor-resistor discharge circuit, the capacitor receiving a predetermined charge with each pulse of the trigger circuit 86, and including a Zener diode or the equivalent connected across the capacitor to limit the maximum voltage thereof to a predetermined level L. The decay line of the circuit 104 is sufficiently large that marking pulses spaced at time $2d$ apart repeatedly charge the capacitor to its highest voltage L, but the decay time is small enough that in a time $6d$ the voltage decay is more than the voltage increase caused by one marking pulse from trigger circuit 86. The output of the decay circuit 104 is delivered to a trigger circuit 106 which yields an output only when the input voltage exceeds a level T almost as high as the maximum voltage L of the decay circuit. The output pulses of trigger 106 are the output of the fill-in circuit 89 used in a manner described hereinbefore.

A communication system has been described herein which chooses one signal sample or a small train of samples depending on the degree of redundancy thereof. However, it is possible to chose one or several large groups of signals, such as one or several video scan lines, on the basis of the degree of redundancy present, and to store and transmit any of the groups of signals so as to reduce the time-bandwidth requirements for transmitting a certain quantity of information.

FIGURE 6 represents an image composed of a plurality of numbered scan lines. The odd-numbered lines are all included, but several of the even-numbered lines 2, 4 and 10, which represent scan lines containing a very high proportion of redundancy, are not included. Substantially all of the important details of the image could be obtained without the scan lines 2, 4 and 10, so that it is unnecessary to transmit the signals defining these lines. If the signal from the video camera includes the unnecessary lines, these can be merely deleted from the transmitted signal; however, generally no advantage would result because random empty periods would result which could not be utilized. By the apparatus of this invention, a video signal is transmitted which does not include unnecessary scan lines or unused gaps representing them, and an increase in time-bandwidth efficiency is obtained.

Figure 7:
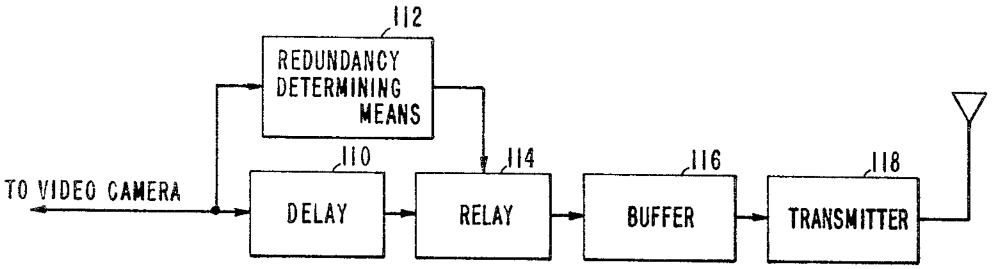
FIGURE 7 is a simplified block diagram of a circuit for transmitting groups of signals representing selected scan lines of a video signal constructed in accordance with the invention.

FIGURE 7 is a simplified block diagram of a circuit for efficiently transmitting only some of the scan lines of a video signal. The original video signal is first passed through a delay means 110 where the signal is delayed while it is monitored in a redundancy determining means 112 to determine whether a scan line thereof includes sufficient detail to justify its transmittal. If the scan line is not to be transmitted, then a signal is delivered by the redundancy determining means 112 to a relay 114 to open the relay during a period when a portion of a delayed video signal defining the subject scan line is entering the relay 114. Therefore, a video signal passing through the relay 114 to a buffer means 116 includes gaps. The buffer delivers a uniform signal without gaps to the transmitter 118 to enable the efficient transmittal of a video signal.

The redundancy determining means 112 may determine redundancy according to any one of several standards. One method is on the basis of the proportion of the time during which the video signal varies at more than a predetermined rate. A differentiating circuit, such as a circuit 50 of FIGURE 1, can be used together with a trigger circuit 66 to generate pulses when the video signal is changing rapidly. A counting circuit counts the number of pulses generated by the trigger circuit and delivers a relay opening signal to the relay 114 of FIGURE 7 if less than a certain number of pulses is counted during the passage of a scan line. Marking signal means are, of course, transmitted to indicate where scan lines have been deleted.

In some applications, it may be desirable to transmit only one out of many video scan lines, such as one out of four, for periods of high redundancy. Reading out or recording only one of several scan lines results in larger gaps where none of the details are retained in the reconstructed image, but the time-bandwidth savings often may justify this.

The examples of the invention described in detail herein employ only two sampling rates, a fast and slow rate. However, for more efficient transmittal or recording, three or more rates may be employed. For example, in the case of individual signal sampling, samples may be taken at intervals of $\Delta t$, $3\Delta t$, or $9\Delta t$ for periods of low redundancy, intermediate redundancy, and high redundancy, respectively. In the case of video scan lines only one out of eight lines, one out of four lines, or every line may be read-out for periods of high, intermediate, or low redundancy, respectively.

Although the invention has been described by reference to systems which are especially useful for video signal transmission, the invention has other applications. Signals from such devices as temperature or radiation monitors on space craft include large periods of redundancies and such signals may be efficiently transmitted in accordance with the principles of this invention. Additionally, the output of the buffer means of the transmitter, such as buffer 67 of FIGURE 4, may be transmitted to a tape recorder for play back at a much later time, rather than to a radio transmitter for immediate transmission.

While particular embodiments of the invention have been described in detail, many further variations may be employed without departing from the spirit and scope of the claims which follow herein.

What is claimed is:

1. A transmitter for video signals substantially defined by a plurality of signals defining scan lines comprising:
  - delay means for delaying said video signals for a period of at least the duration of one scan line;
  - relay means for passing said video signal connected to said delay means;
  - redundancy determining means for determining the degree of redundancy of said video signals and for generating relay opening signals only during the period of at least one scan line when the redundancy of said signal exceeds a predetermined level, connected to said relay means; and
  - buffer storage means connected to said relay means for recording said scan lines as they are received therefrom and for delivering groups of signals defining scan lines at a substantially uniform rate.

2. A communication system for handling input information signals which are in a form that includes a large proportion of redundancies comprising:
  - sampling means responsive to said input information signals for generating samples thereof;
  - redundancy determining means responsive to said input information signals for determining the degree of redundancy in portions of said signals;
  - means coupling said redundancy determining means and said sampling means for operating said sampling means to sample signals more frequently during signal intervals which include more information than other intervals which include less information;
  - marker generating means responsive to redundancy determinations of said redundancy determining means for generating marker signals indicating the separation between samples taken by said sampling means;
  - buffer storage means for recording information signal samples and marker signals;
  - means responsive to the outputs of said sampling means and said marker generating means for recording signals in said buffer storage means including samples of said information signals and said marker signals interspersed with each other; and
  - read out means coupled to said buffer storage means for reading out signals therefrom at a substantially uniform rate.

3. A communication system as defined in claim 2 wherein:
  - said means for recording signals in said buffer storage means includes means for generating a signal having a predetermined range of values for those inputs thereto representing samples of said information signals and having a value outside of said range for signals representing said marker signals, whereby to enable differentiation of information signal samples and marker signals.

4. A communication system as defined in claim 2 wherein:
  - said means for recording signals in said buffer storage means comprises means for delivering a signal representing a marker signal at a time between the delivery of signals representing successively generated information signal samples from said sampling means.

5. A receiver for reconstructing information represented on a single communication channel by received signals including successive information signal samples interspersed with marker signals indicating the relative time location of said information signal samples, said receiver comprising:
  - buffer storage means;
  - means responsive to said received signals for suppressing said marker signals and coupling only said information signal samples to said buffer storage means;
  - means responsive to said marker signals and the value of information signal samples occurring between successive marker signals, for selectively applying a plurality of output signal samples of a value related to the value of said information signal samples to said buffer storage means; and
  - means for reading out samples from said buffer storage means at a substantially regular rate.

6. A receiver as defined in claim 5 wherein:
  - said means for suppressing said marker signals comprises control means responsive only to said marker signals and relay means controlled by said control means for suppressing the passage of said received signals upon the occurrence of each marker signal detected by said control means.

References Cited

UNITED STATES PATENTS

| | | |
|---|---|---|
| 3,006,991 | 10/1961 | Cherry et al. |
| 3,051,778 | 8/1962 | Graham. |
| 3,299,204 | 1/1967 | Cherry et al. |

OTHER REFERENCES

Barnette et al.: "Bandwidth Reduction for Television," RCA T.N. 152, Aug. 18, 1958.

ROBERT L. GRIFFIN, *Primary Examiner.*

R. L. RICHARDSON, *Assistant Examiner.*